US008024315B2

(12) United States Patent
Cheng et al.

(10) Patent No.: US 8,024,315 B2
(45) Date of Patent: Sep. 20, 2011

(54) METHOD OF DYNAMICALLY PROVIDING A COMPOUND OBJECT'S SOURCE INFORMATION DURING ITS DEVELOPMENT

(75) Inventors: Ping Cheng, Beijing (CN); Ya Bin Dang, Beijing (CN); Lin Luo, Beijing (CN); Peter K. Malkin, Ardsley, NY (US); Vadakkedathu T. Rajan, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 12/249,472

(22) Filed: Oct. 10, 2008

(65) Prior Publication Data
US 2009/0089262 A1    Apr. 2, 2009

Related U.S. Application Data

(63) Continuation-in-part of application No. 11/780,583, filed on Jul. 20, 2007, now Pat. No. 7,769,787.

(51) Int. Cl.
*G06F 17/30* (2006.01)
(52) U.S. Cl. ........................................ 707/706; 707/771
(58) Field of Classification Search .................. 707/706, 707/771
See application file for complete search history.

(56) References Cited

U.S. PATENT DOCUMENTS

| | | | |
|---|---|---|---|
| 5,535,392 A | 7/1996 | Brett | |
| 5,778,357 A * | 7/1998 | Kolton et al. | 707/603 |
| 6,035,297 A * | 3/2000 | Van Huben et al. | 707/695 |
| 6,091,896 A | 7/2000 | Curreri et al. | |
| 6,694,331 B2 * | 2/2004 | Lee | 707/706 |
| 6,698,013 B1 | 2/2004 | Bertero et al. | |
| 6,865,568 B2 * | 3/2005 | Chau | 707/706 |
| 7,031,960 B1 * | 4/2006 | Costin et al. | 715/843 |
| 7,146,367 B2 * | 12/2006 | Shutt | 709/217 |
| 7,188,100 B2 * | 3/2007 | De Bellis et al. | 707/706 |
| 7,209,917 B2 * | 4/2007 | Probst et al. | 707/706 |
| 7,370,273 B2 * | 5/2008 | Beyer et al. | 707/771 |
| 7,386,539 B2 * | 6/2008 | Hung et al. | 707/695 |
| 2002/0108106 A1 | 8/2002 | Kramskoy et al. | |
| 2004/0078464 A1 * | 4/2004 | Rajan et al. | 709/224 |
| 2004/0177343 A1 | 9/2004 | McVoy et al. | |
| 2005/0021689 A1 | 1/2005 | Marvin et al. | |
| 2005/0076331 A1 | 4/2005 | Das et al. | |
| 2005/0193369 A1 | 9/2005 | Brumme et al. | |
| 2005/0262482 A1 | 11/2005 | Wagner et al. | |
| 2006/0041837 A1 | 2/2006 | Amir et al. | |
| 2008/0046484 A1 * | 2/2008 | Ellis et al. | 707/204 |
| 2008/0184270 A1 * | 7/2008 | Cole et al. | 719/318 |

* cited by examiner

*Primary Examiner* — Don Wong
*Assistant Examiner* — Kim T Nguyen
(74) *Attorney, Agent, or Firm* — Scully, Scott, Murphy & Presser, P.C.; Stephen C. Kaufman, Esq.

(57) ABSTRACT

A method and system for dynamically providing a composite source information report whenever source information of a composite object is updated. The system includes a subscription handler for receiving a subscription request and generating a subscription query, a means for determining whether source information of an element in a composite object has been edited (added, deleted and/or modified), a source information determining handler for automatically determining source information of an element in a composite object and a composite source information report generation handler for generating a composite source information report and providing the report to users. The system further comprises an authentication handler, an editing handler, an editing monitor, a source information recording handler, subscription source information retrieving handler and a server database.

15 Claims, 6 Drawing Sheets

METHOD OF DYNAMICALLY PROVIDING A COMPOUND OBJECT'S SOURCE INFORMATION DURING ITS DEVELOPMENT

CROSS-REFERENCE TO RELATED APPLICATIONS

The present invention is a continuation-in-part and claims the benefit of priority of U.S. application Ser. No. 11/780,583 filed Jul. 20, 2007, the entirety of which is incorporated herein by reference.

BACKGROUND OF THE INVENTION

The present invention relates to generating a composite source information report (i.e., a report including elements of a composite object (i.e., an object composed of one or more elements) and source information (e.g., creators, owners, importers, origins, access rights) of the elements). More particularly, the present invention is related to tracking source information of a composite object while developing the composite object.

One of major costs in a creation of a composite object (i.e., an object composed of one or more elements which are software, hardware or a combination of them) like software applications, automobiles, television shows or movies products is a tracking of source information (e.g., creators, importers, owners, etc.) of the elements in the composite object. With current existing technology, it takes a long time to determine, find out and trace source information of every element in a composite object.

A commonly owned and copending U.S. patent application Ser. No. 11/780,583) (hereinafter "Ariadne"), which is incorporated by reference, discusses a system and method for monitoring source information of each and every element in a composite object. In addition, Ariadne can provide the source information of all the elements in a composite object upon requesting (e.g., SQL query).

However, Ariadne and existing solutions do not provide any mechanism allowing a user to subscribe to receive an update in source information of an element in a composite object. Thus, when using Ariadne or existing solutions, a user has to make requests (or SQL queries) periodically in order to check whether there is an update in an element in a composite object or whether there is an update on source information of an element in a composite object.

Therefore, it would be highly desirable to provide a system and method for dynamically providing a composite source information report whenever source information of an element in a composite object is updated.

SUMMARY OF THE INVENTION

The present invention describes a system and method for generating and providing a composite source information report whenever source information of a composite object is updated while the composite object is developed.

In one embodiment, there is provided a computer-implemented system for dynamically providing a composite source information report whenever source information of a composite object is updated, the composite object including one or more elements, comprising:

a computer-implemented subscription handler for receiving a subscription request from a user for subscribing to the composite source information report, parsing the subscription request to identify the user and to generate a subscription query, and storing the subscription query associated with the user in a database;

a computer-implemented subscription source information retrieving handler for retrieving the subscription query from the database and retrieving the source information based on the subscription query from the database;

means for determining whether the source information has been updated since a last retrieval of the source information; and a computer-implemented composite source information report generation handler for generating a composite source information report based on the source information and providing the composite source information report to the user, if the source information has been updated since the last retrieval of the source information.

In one embodiment, there is provided a computer-implemented method for dynamically providing a composite source information report whenever source information of a composite object is updated, the composite object including one or more elements, comprising:

receiving a subscription request from a user for subscribing to the composite source information report, parsing the subscription request to identify the user and to generate a subscription query, and storing the subscription query associated with the user in a database;

retrieving the subscription query from the database and retrieving the source information based on the subscription query from the database;

determining whether the source information has been updated since a last retrieval of the source information; and generating a composite source information report based on the source information and providing the composite source information report to the user, if the source information has been updated since the last retrieval of the source information.

In one embodiment, the composite source information report includes one or more of:

an indication of the elements whose source information is known;

an indication of the elements whose source information is not known;

an indication of the number of the elements whose source information is not known;

an indication of the number of the elements added by a particular user whose source information is not known; and an indication of increases or decreases in the number of the elements whose source information is not known.

In one embodiment, the subscription query specifies one or more of:

a change in the source information that will trigger generating a new composite source information report;

the source information that is included in the new composite source information report; and the elements in the composite object.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

An object in the present invention refers to hardware (e.g., a television, a radio, a cellular phone, etc.), software (e.g., a widget) and/or services (e.g., a mail forwarding service). For example, a hardware object is an Apple® iPhone™, Samsung® Television, Casio® Watch, etc. . . . A software object is a Microsoft® Windows® Vista™, IBM® DB® 2, Apple® Safari®, etc. . . . A service object is a gardening service, a homecare service, a house cleaning service, etc. . . . An element in the present invention refers to a sub-object or a part of an object. In a composite object (i.e., an object comprised of sub-objects or parts), an element refer to a sub-object or a part in the composite object.

In one embodiment, source information of an element refers to an owner of the element, an importer of the element, an origin of the element, an editing method (e.g., typing text) associated with the element, an access right to the element (e.g., who can open the element, who can modify the element, who can delete the element), a certificate of originality of the element (e.g., a certificate that proves the element is genuine) and/or relevant date and time information (e.g., a creation date and time, modification date and time, deletion date and time of the element). Source information of a composite object refers to source information of all elements (i.e., sub-objects or objects from which the composite object is composed) in the composite object.

A composite source information report of a composite object refers to a report including source information of all elements in the composite object and/or an indication of elements whose source information is not known. In one embodiment, the composite source information report of a composite object comprises, but is not limited to include:

an indication of elements whose source information is known;

an indication of elements whose source information is not known;

an indication of the number of elements whose source information is not known;

an indication of the number of elements added by a particular user whose source information is not known;

an indication of increase or decreases in the number of elements whose source information is not known.

Figure 1:
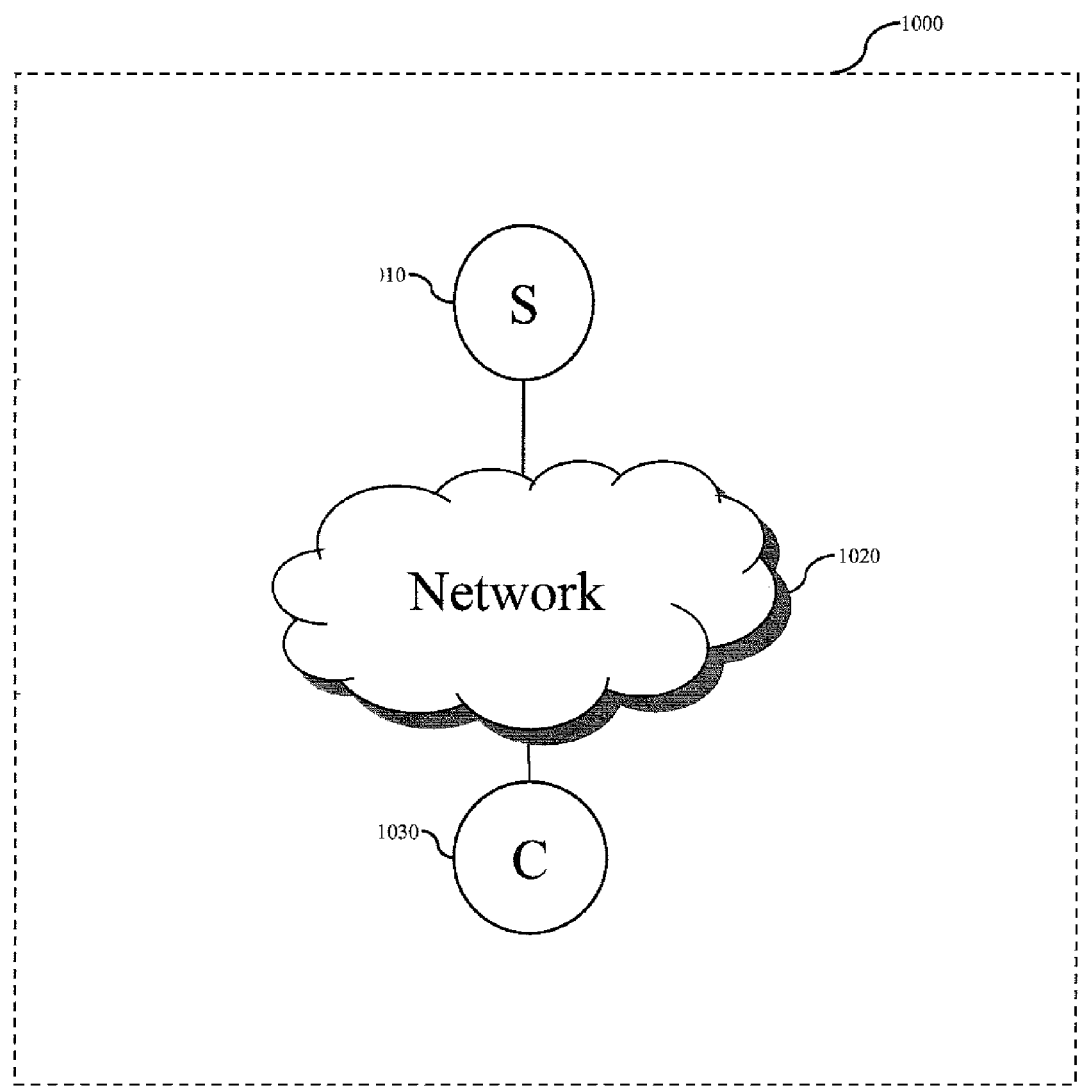
FIG. 1 depicts a system diagram in a client/server environment where one embodiment of the present invention is employed.

FIG. 1 illustrates a client/server environment where one embodiment of the present invention is employed. A server device 1010 is connected to a client device 1030 through a network 1020 (e.g., a wireless network, a physical link, a wired network, Internet, Intranet, etc.). In one embodiment, there are a plurality of server devices such as the server device 1010. There are a plurality of client devices such as the client device 1030. A user operates a client device (e.g., the client device 1030) to communicate with a server device (e.g., the server device 1010). In one embodiment, the server device 1010 enables a user or a client device (e.g., the client device 1030) to subscribe to receive a composite source information report of a composite object and dynamically provides (e.g., provides whenever there is an update on source information of an element in a composite object) the composite source information report to clients devices or users according to their subscription. In one embodiment, the subscription of a composite source information report includes interests (e.g., which elements the client device wants to check periodically) of the users or the client devices. On the subscription, a user or a client device specifies which source information (e.g., creator or owner, etc.) the user or the client device wants to be informed and/or which elements the user or the client device wants to be informed.

In one embodiment, the server device 1010 is described in detail with reference to FIGS. 2-6. A client device (e.g., the client device 1030) can be a computing device that can run a web browser (e.g., Microsoft® Internet Explorer®) and communicate with the server device 1010 over the network 1020. Examples of the client device 1030 are, but are not limited to: a laptop (e.g., IBM® ThinkPad®), a desktop, a PDA, a smartphone (e.g., Apple® iPhone®) and a cellular phone (e.g., LG® VX8100) with a web browser (e.g., Openwave®). The server device 1010 can also be a computing device such as a desktop, a mainframe, a workstation or a laptop.

Figure 2:
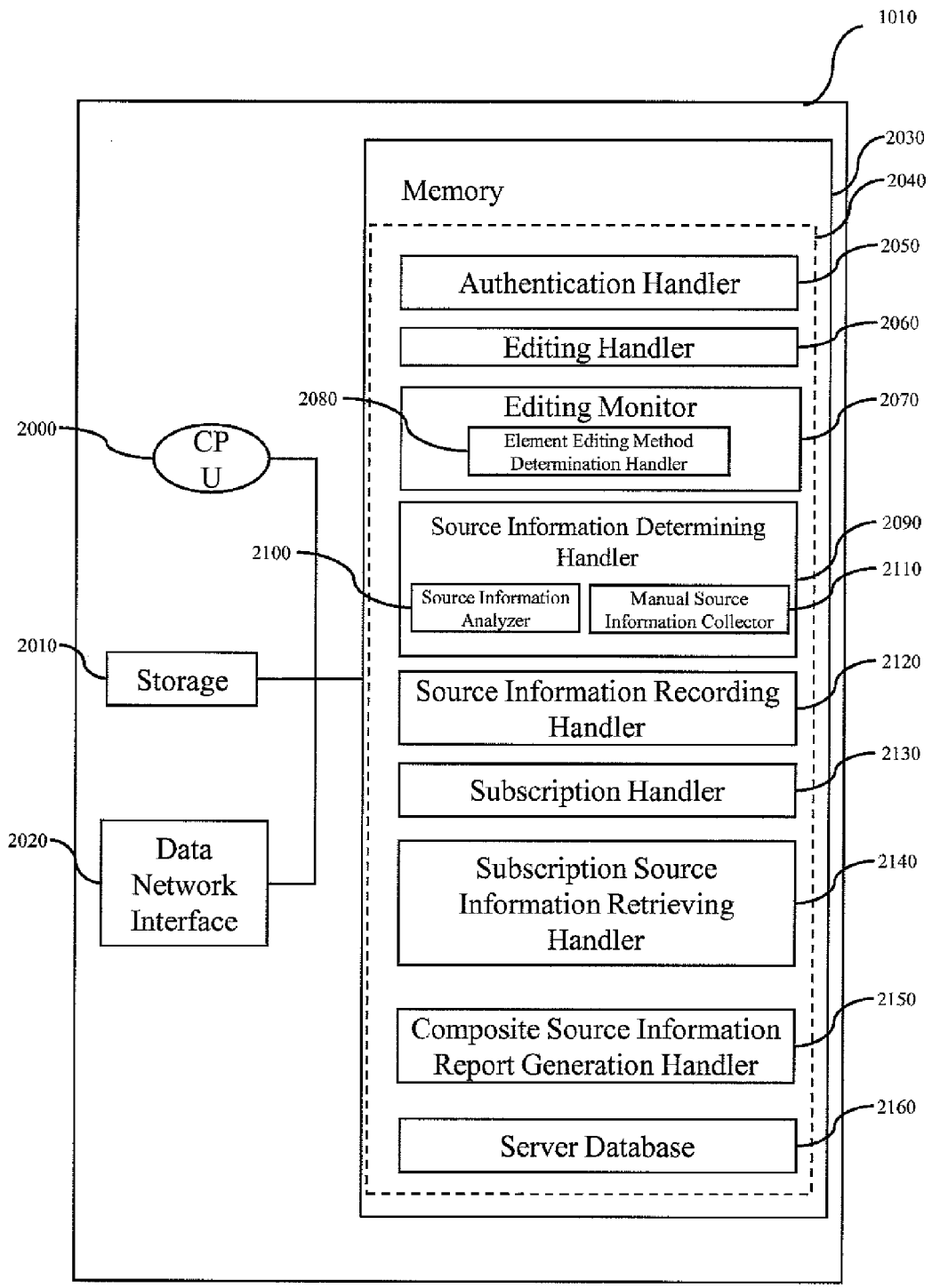
FIG. 2 depicts a system diagram of a server in one embodiment of the present invention.

FIG. 2 illustrates a system diagram of the server device 1010 in one embodiment of the present invention. The server device 1010 comprises a processor 2000 (e.g., Intel® Core™ 2 processor, IBM® Cell processor, etc.), a storage device 2010 (e.g., a magnetic disk, a hard disk, an optical disk, a compact disk, a digital versatile disk, a solid state disk, etc.), a network interface 2020 (e.g., Ethernet interface, wireless network (e.g., Wi-Fi, WiMA, etc.) interface, VoIP interface), a memory 2030 (e.g., DRAM, SRAM, SDRAM) and a system logic 2040. The system logic 2040 in the server device 1010 comprises an authentication handler 2050, an editing handler 2060, an editing monitor 2070, a element editing method determination handler 2080, a source information determining handler 2090, a source information analyzer 2100, a manual source information collector 2110, a source information recording handler 2120, a subscription handler 2130, a subscription source information retrieving handler 2140, a composite source information report generating handler 2150 and a server database 2160. The subscription handler 2130 is described in detail with reference to FIG. 4. The handlers 2050-2130 are described in detail with reference to FIG. 5. The handlers 2140-2150 are described in detain with reference to FIG. 6.

In one embodiment, the handlers 2050-2150 in the system logic 2040 are implemented as software using a programming language (e.g., C, C++, Java, NET, etc.). In one embodiment, the handlers 2050-2150 in the system logic 2040 are recorded in a computer readable medium (e.g., CD (Compact Disc), DVD (Digital Versatile Disc), HDD (Hard Disk Drive), a memory 2030) as an instruction (e.g., a machine language or assembly language) that is executed by a processor (e.g., Intel® Pentium®, IBM® Power PC®, AMD® Opteron®).

In another embodiment, the handlers 2050-2150 in the system logic 2040 are implemented as hardware on a reconfigurable hardware (e.g., FPGA (Field Programmable Gate Array) or CPLD (Complex Programmable Logic Device)) using a hardware description language (Verilog, VHDL, Handel-C, or System C). In a further embodiment, the handlers 2050-2150 in the system logic 2040 are implemented on a semiconductor chip (e.g., ASIC (Application-Specific Integrated Circuit)) using a semi custom design methodology (i.e., designing a chip using standard cells and a hardware description language).

In a further embodiment, the handlers 2050-2150 in the system logic 2040 are implemented as hardware through a computing device (e.g., a server device 1010) by being executed in the computing device. The computing device comprises, but not limited to include, processor(s) 2000, memory(s) 2030, display device(s) (not shown), input/output device(s) (not shown) and network interface(s) 2020.

The server database provides creation, deletion and modification of persistent data (e.g., source information of elements, source information of composite objects, elements, composite objects) used by handlers 2050-2150. Examples of the server database are, but are not limited to: Oracle®, IBM® Informix® and IBM® DB 2®.

Figure 3:
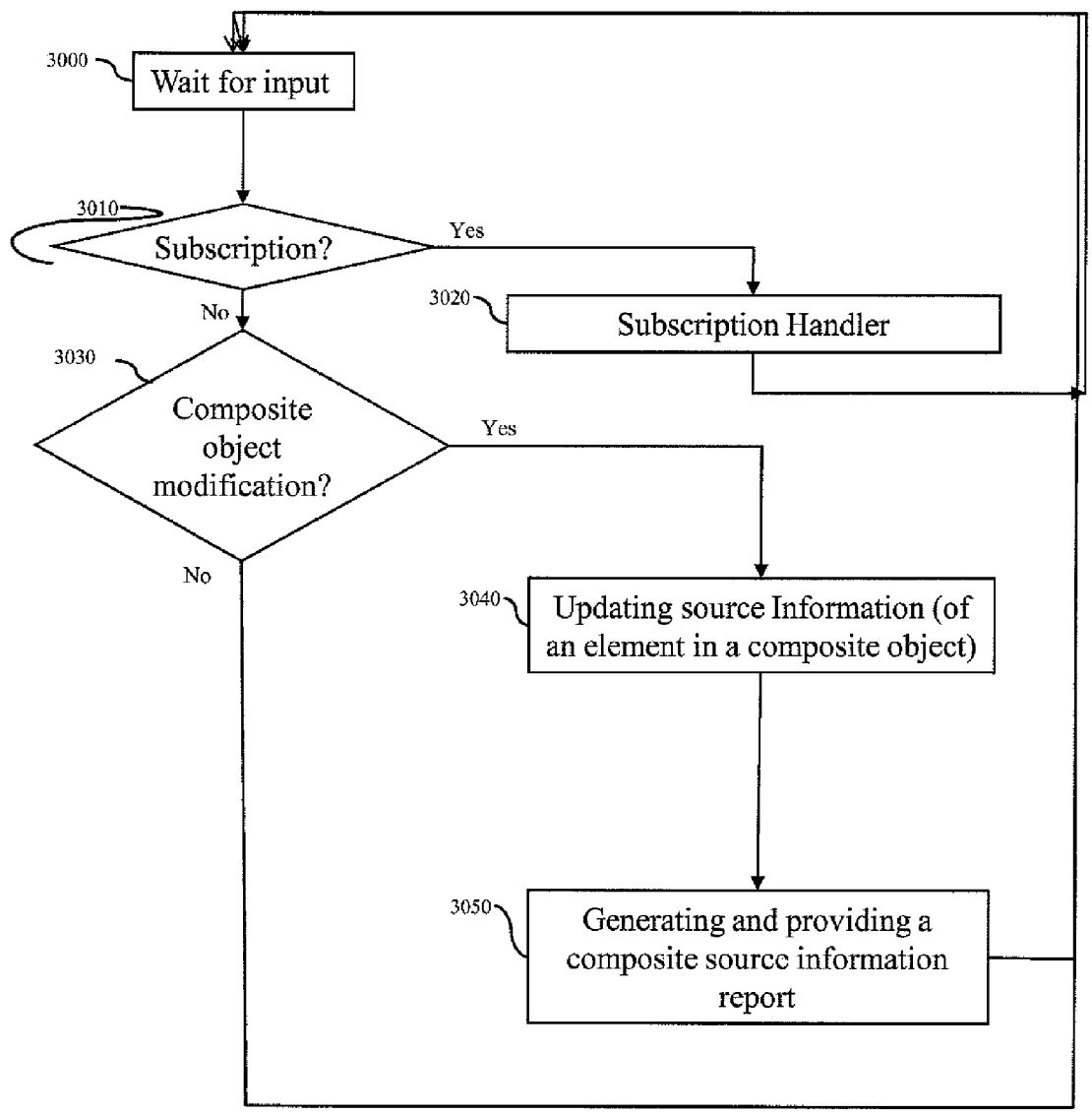
FIG. 3 depicts a flow chart of a server in one embodiment of the present invention.

FIG. 3 is a flow diagram illustrating a control flow of the system logic 2040 in one embodiment of the present invention. At step 3000, the server device 1010 waits for inputs. When such an input is received, at step 3010, it is checked whether the input is a subscription request (i.e., a request that indicates a user wants to subscribe a composite source information report) from a client device (e.g., the client device 1030). If the input is the subscription request, at step 3020, the subscription handler 2130 (will be described in detail with reference to FIG. 4) is invoked, to process the subscription request. Then, the server device 1010 returns to step 3000 to receive another input from a client device or a user. If the input is not a subscription request, at step 3030, it is checked through the editing monitor 2070 whether the input is a request by a user or a client device to modify a composite object. If the input is the request to modify a composite object, at step 3040, source information of the composite object is updated (the updating source information is described in detail with reference to FIG. 5). At step 3050, the update of source information is reported to a user or a client device (the reporting the update of the source information is described in detail with reference to FIG. 6). Then, the server device 1010 returns to the step 3000 to receive another input.

Figure 4:
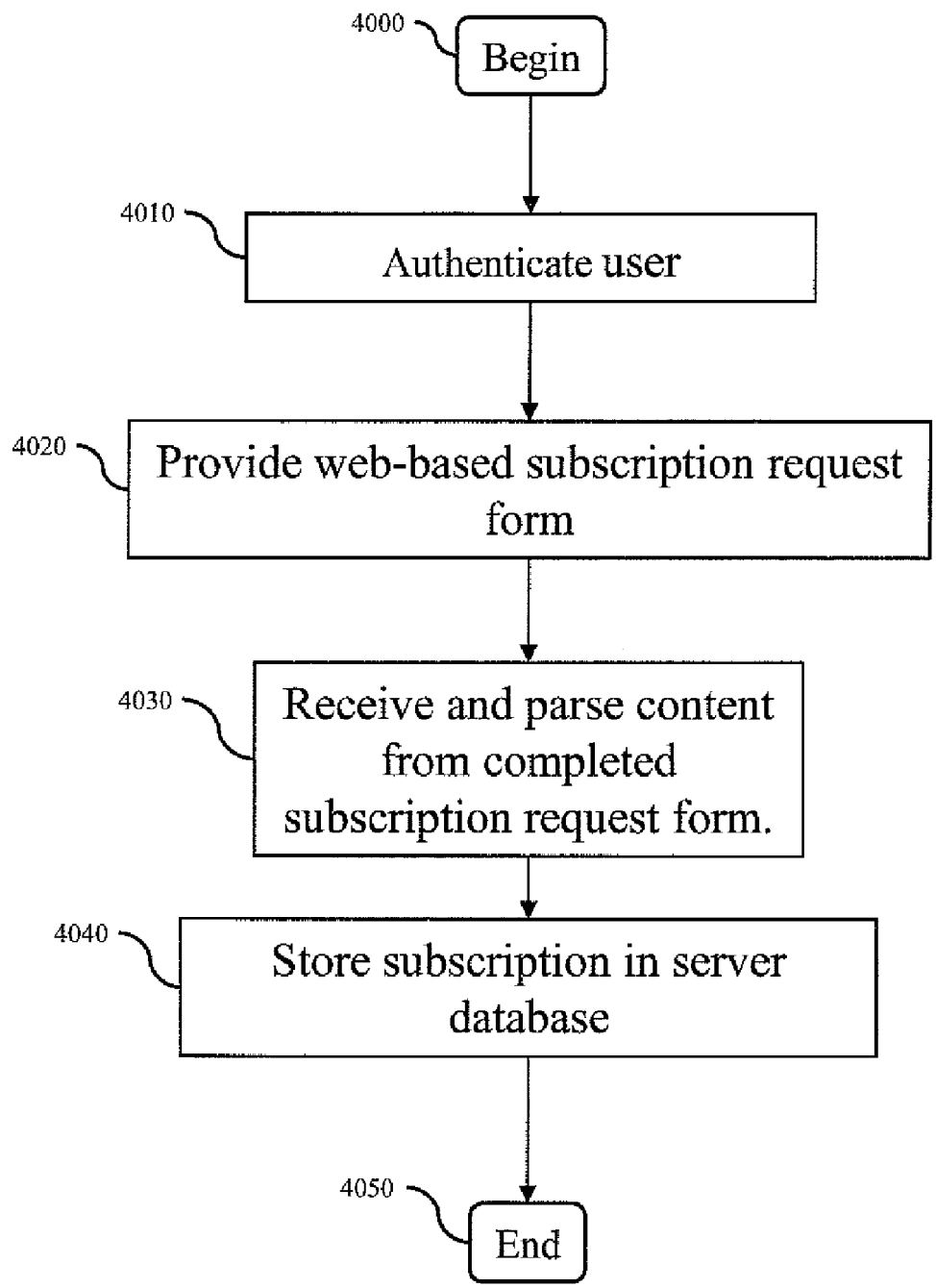
FIG. 4 depicts a flow chart of a subscription handler in one embodiment of the present invention.

The subscription handler 2130, invoked in step 3020, enables a user or a client device to subscribe to dynamically receive a composite source information report about a compound object being developed whenever source information of an element in the compound object is updated or revised. FIG. 4 is a flow chart illustrating a control flow (i.e., an order of tasks based on which the subscription handler 2130 executes and processes) of the subscription handler 2130 in one embodiment of the present invention. At step 4000, the subscription handler 2130 is invoked (e.g., at step 3020 in FIG. 3). At step 4010, an authentication handler 2050 is invoked to verify an identity of the user or the client device. In one embodiment of the present invention, the identity of the user need not be verified, so the subscription handler 2130 can skip the step 410 by not invoking the authentication handler 2050. To verify an identity of a user or a client device, the authentication handler 2050 utilizes one or more of: a pair of username and password (e.g., providing a username and password to log in to a system via a graphical user interface (GUI)), Kerberos (i.e., a computer network authentication protocol, which allows individuals to communicate over a non-secure network to prove their identities each other in a secure manner), Needham-Schroeder (Needham-Schroeder Symmetric Key Protocol establishing a session key between two parties on a network to protect communications between them, Needham-Schroeder Public-Key Protocol providing mutual authentication between two parties communicating on an insecure network), PKI (Public Key Infrastructure; an arrangement that binds public keys (public key cryptography refers to a cryptography in which a key used to encrypt a message differs from a key used to decrypt it) with respective user identities by means of a certificate authority (i.e., an entity issuing digital certificates for use by other parties), etc. At step 4020, the subscription handler 2130 provides a subscription request form (not shown) (i.e., a form to enable/ assist a user or a client device to enter/send his/her subscription request) to the user of the client device. In one embodiment, the subscription request form is a web-based request form written by HTML or XML. In another embodiment, the subscription request form is an applet written by Java™.

In one embodiment, the subscription request form includes, but is not limited to include:
    changes in source information that will trigger generating a new composite source information report associated with a composite object;
        an addition of new source information (e.g., the addition of the new source information corresponding to an element in the composite object whose source information was previously unknown);
        a modification of existing source information (e.g., an indication that a piece of program code previously copied from an open source software (e.g., GNU, Java, Apache HTTP server, Mozilla) has been rewritten by a co-worker to avoid an ownership conflict); and
        an addition of a new element whose source information is not known;
    whether a composite source information report should include any or all of following:
        an indication of elements whose source information is known;
        an indication of elements whose source information is not known;
        an indication of the number of elements whose source information is not known;
        an indication of the number of elements added by a particular user whose source information is not known; and
        an indication of increase or decreases in the number of elements whose source information is not known.
    an indication of whether elements or source information of the elements need to be categorized or not. If the elements or the source information of the elements need to be categorized, one or more of following categories are applied:
        by a developer of an element;
        by an element;
        by an owner of an element;
        by entry date of an element (e.g., a creation date of the element) and
        by a subject of an element (e.g., user interface, database, mathematics);
    source information of an element that may be included in the composite source information report:
        an owner of the element, an importer of the element, an origin of the element, an editing method (e.g., typing text) associated with the element, an access right to the element (e.g., who can open the element, who can modify the element, who can delete the element), a certificate of originality of the element (e.g., a certificate that proves the element is genuine) and/or relevant date and time information (e.g., a creation date and time, modification date and time, deletion date and time of the element)
    elements to be included in the composite source information report (e.g., code, comments, graphics): The composite source information report includes the only elements that are specified or requested on the subscription request form. If no element is selected on the subscription request form, no composite source information report is generated.

After the user or the client device completes and submits the subscription request form to the server device 1010, at step 4030, the subscription handler 2130 receives the completed subscription request form. In one embodiment, the completed subscription request form is treated as a subscription request by the subscription handler 2030. After receiving the subscription request (e.g., completed subscription request form), the subscription handler 2030 parses contents of the subscription request to identify the user and to generate subscription query. In one embodiment of the present invention, the subscription request is specified as a SQL query. The subscription query specifies one or more of:

a change in source information (of an element that a user selected to receive an update on source information of the element) that will trigger generating a new composite source information report;
  source information (of an element or of a composite object) that is included in the new composite source information report; and
  elements (in the composite object) that are selected to receive an update on source information of them.

Then, at step 4040, the subscription handler 2130 stores the subscription query along with an identity of the user or the client device in the server database 2160. At step 4060, the subscription handler 2130 is discharged.

Figure 5:
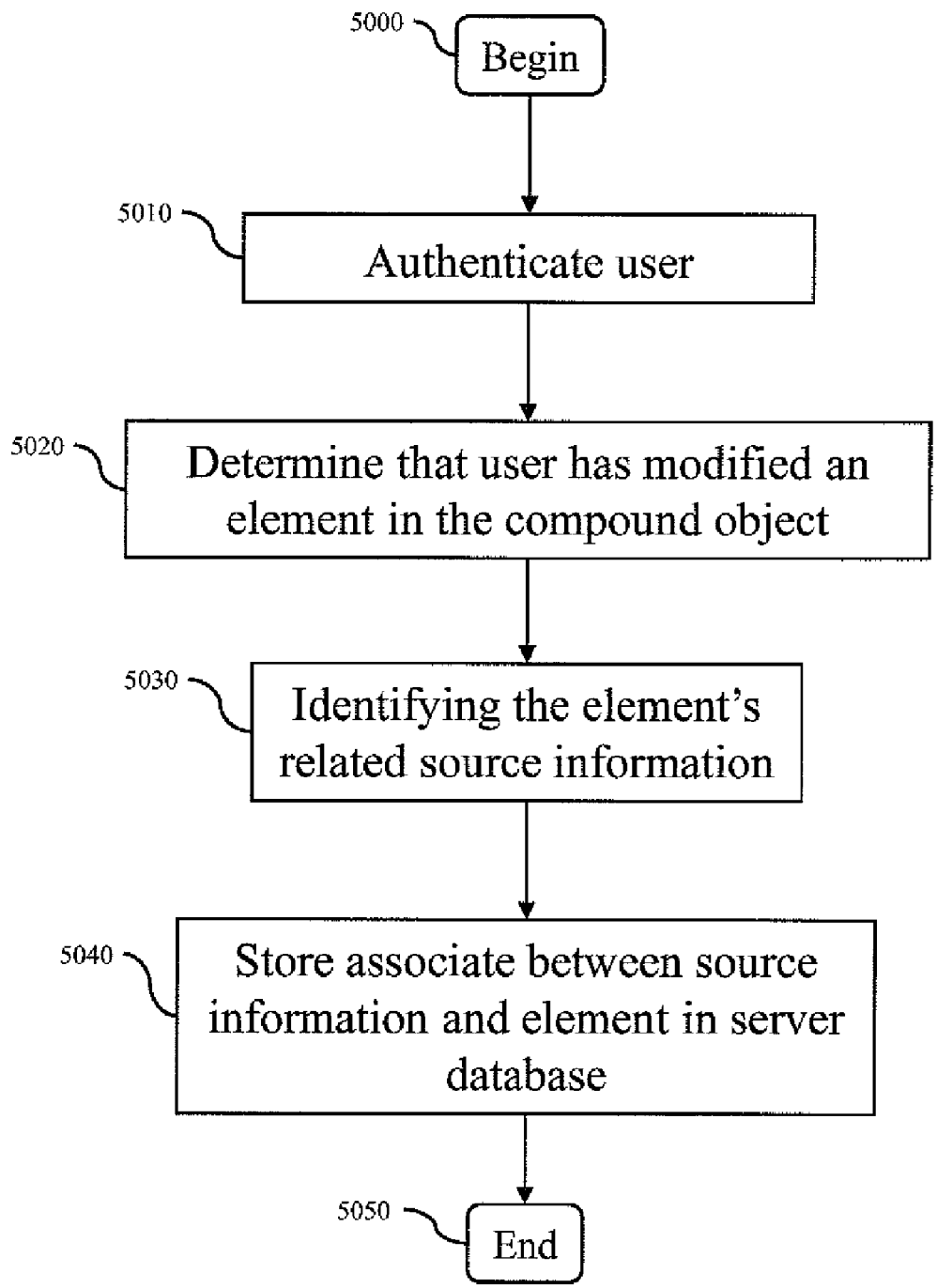
FIG. 5 depicts a flow chart of updating source information of an element in a composite object in one embodiment of the present invention.

FIG. 5 illustrates a flow chart of updating source information of an element in a composite object. At step 5000, a process for updating source information of an element is initiated (e.g., at step 3040 in FIG. 3). At step 5010, an authentication handler 2050 is invoked to assist a user in logging in to the editing handler 2060 which enables a user or a client device to edit an element in a composite object. In one embodiment, after the user is verified by the authentication handler 2050, the user or the client device is securely connected to the editing handler 2060 via Transport Layer Security (TLS) (i.e., a cryptographic protocol that provides secure communications on the Internet for web browsing, email, Internet faxing, instant messaging, and other data transfers). In one embodiment, the user or the client device does not need to be verified to access the editing handler 2060. In this embodiment, the authentication handler 2050 is not invoked by skipping the step 5010.

At step 5020, the user or the client device performs editing actions (e.g., deletion, modification, addition) on an element through the editing handler 2060. In one embodiment, there is the editing monitor 2070 that monitors the editing actions and determines that an element or a composite object has been edited (e.g., a line has been added to program code) based on the monitoring. In one embodiment, the editing monitor 2070 includes the element editing method determination handler 2080. The element editing method determination handler 2080 determines which method (e.g., typing text or copy-or-cut-and-pasting (i.e., copy a text in a document and paste the text in another document; cut a text in a document and paste the text in another document) the user or the client device used to edit (e.g., delete, add, modify) the element. In one embodiment, the element method determination handler 2080 determines that the user is editing the element based on typing text, when the element method determination handler 2080 detects typing on an input/output device (e.g., keyboard) by the user. In another embodiment, the element method determination handler 2080 determines that the user is editing the element based on copy-or-cut-and-pasting, when the element method determination handler 2080 detects copying and pasting texts by using an input/output device (e.g., a mouse) or cutting and pasting texts by using an input/output device (e.g., a mouse).

In the present invention, there are various methods by which an element can be edited in a composite object, which may be dependent on a type of the composite object being edited, but which can be generally classified into two categories:

a first category of methods by which an element in the composite object is originally created or edited;
  a second category of methods by which an element already created by a $3^{rd}$ party (e.g., Open Source Software) is introduced into the composite object being edited;

The first category of methods includes inputting an element through a user input device (e.g., a keyboard or an electronic pen) by the user who is editing the composite object. The examples of the inputting an element through a user input device includes, but is not limited to: typing a new line of code in a program code file during program development through a keyboard, drawing an image in an image file with a stylus and recording a new piece of audio or video in a multimedia file through a microphone or a digital video camera attached to a computer. The first category of the methods further includes deleting or modifying an existing element in the composite object by the user, who is editing the object. The modifying includes, but is not limited to: modifying content or format of the composite object or the existing element, a manipulation of the composite object, e.g., by bit-level programming (i.e., manipulating a machine code).

The second category of methods includes importing an element from an outside source (i.e., $3^{rd}$ party; e.g., Open Source Software). Examples of this importing an element from an outside source include, but are not limited to: copying or cutting a piece of code from other source code file(s) (e.g., .cpp file or java file) and pasting the piece of code on a source code file (e.g., .cpp file or java file) that the user is editing, copying or cutting an image from a shareware web site (i.e., a web site including freeware or shareware) and inserting or pasting the image into a multimedia file that the user is editing, copying or cutting an audio or video file from a shareware web site and inserting the audio or vide file into a multimedia file that the user is editing, incorporating a library file into a source code file that the user is editing, providing a link in a document that the user is editing (e.g., providing a hyperlink in a web page, by clicking the hyperlink, being connected to a new web page/web site); and utilizing an inheritance feature in OOP (Object Oriented Programming) (e.g., defining a new class that inherits attributes and behavior of pre-existing class).

In one embodiment of the present invention, the editing handler 2060 adopts a preservable editing method (i.e., a method retaining deleted element and source information of the deleted element). For example, if an element is added in a composite object, the element is added in the composite object, and its source information is recorded in a database (e.g. a server database 2160) associated with the composite object. If an element is deleted in a composite object, the deleted element and its source information are retained in a database associated with the composite object. In one embodiment, the deleted element remains in the composite object with a flag, e.g., a negative sign (i.e., a minus sign), indicating that the element is deleted. If an element is modified in a composite object, this modification causes two successive operations: First, the element being modified is deleted, but the deleted element and its source information are retained in a database associated with the composite object. The deleted element may be retained in the composite object with, a flag, e.g., a negative sign, to indicate it is deleted. Second, a new element with modifications is added in the composite object, and source information of the new element is recorded in a database associated with the composite object. The deleted/added/modified element can be selected according to a criteria (e.g., how many authors work on developing a composite object, whether a customer requested a change in a composite object, etc.) of the composite object and according to requirements of a user, who is developing or maintain the composite object.

With the preservable editing method, all the editing operations, including deletion and modification, can be treated as an addition (because a deleted/modified element is retained). A history of editions (e.g., addition, deletion, modification) of a composite object during its whole lifecycle can be retained in the composite object or in a database associated with the composite object. The preservable edition method prevent an author accidentally eliminates any other author's element and its source information. If an element is accidentally deleted, the element can be recovered from retained information (e.g., a deleted element is retained in the composite object or a database). Responsibility of each element in a composite object is clearly maintained with the preservable editing method, because source information of addition/deletion/modification is recorded in a database associated with the composite object.

In another embodiment, the editing handler 2060 deletes an existing element in a composite object by marking the element as deleted and then preserving the element in a database associated with the composite object, wherein the source information of the deleted element is maintained in a database associated with the composite object. The editing handler 2060 may modify an existing element in a composite object by deleting some parts of the element and/or adding some other parts into the element. The deleted parts of the element are marked as deleted and then preserved in a database associated with the composite object. Source information of the deleted parts of the element is maintained in a database associated with the composite object. The added parts of the element are added into the element in the composite object and source information of the added parts is maintained in a database associated with the composite object. Upon a request from a user, the source information of the deleted element, the modified element, deleted parts in the modified element and added parts in the modified element can be obtained e.g., by retrieving the source information from a database associated with the composite object through a SQL query or a subscription query.

Returning to FIG. 5, at step 5030, the editing monitor 2070 invokes the source information determining handler 2090, to identify source information of an element. Specifically, the source information determining handler 2090 including a source information analyzer 2100 and a manual source information collector 2110 automatically determines source information about an element based on methods (e.g., typing text or copy-or-cut-and-pasting) by which the element has been edited in a composite object as determined by the editing monitor 2070 and provides this source information to step 5040. If it is determined by the editing monitor 2070 that an author is adding a new element in a composite object (e.g., typing a text in a document file or typing a code line in a source code file (e.g., .doc file, .ppt file, .cpp file or java file), the source information analyzer 2100 retrieves information of the author (i.e., source information; e.g., name of the author, an email address of the author; an address of the author) from a database (e.g., a server database 2160) or obtain the information of the author from authentication handler 2050 that verified the author at step 5010.

In the one embodiment of the present invention, if the author deletes or modifies an element in a composite object, the source information analyzer 2100 retains the deleted or modified element and its source information. In one embodiment, the deleted element is retained with a flag, e.g., a negative sign, in the composite object or a database associated with the composite object. The modified element is added into the composite object with modification on an original element. Source information of the deleted element or modified element is obtained from a database (e.g., a server database 2160) or the authentication handler 2050 that authenticated the author. In one embodiment, the source information of the deleted or modified element includes a type of an operation (e.g., deletion or modification) and a time of the operation (e.g., when the element is deleted or modified).

In another embodiment of the present invention, if the author is deleting or modifying an element in a composite object, the source information analyzer 2100 preserves source information of the element (i.e., element being deleted or modified). The deleted element is recorded in the composite object as a new element with a negative mark indicating the element is deleted. Source information of the new element is associated with the author through the source information determining handler 2090. Added parts or deleted parts in the modified element are recorded as new parts in the modified element. Added parts are added into the modified element without any mark. Source information of the added parts is associated with the author through the source information determining handler 2090. Deleted parts are added into the modified element with a negative mark indicating that the parts are deleted. Source information of the deleted parts is associated with the author through the source information determining handler 2090. In one embodiment, the source information of the new element, the deleted parts and added parts are retrieved from a database associated with the author. In another embodiment, the source information is obtained from the authentication handler 2050. In a further embodiment, the source information includes a type of an operation (e.g., adding parts in an element being modified, deleting parts in an element being modified, deleting an element) and a time of the operation (i.e., when the operation is performed). If the author modifies a raw data (e.g., binary code or machine code) of a composite object (e.g., .cpp file), the source information analyzer 2100 records that the author modified the raw data of the composite object in the composite object or a database associated with the composite object. Source information of the modified raw data is obtained from a database associated with the author or the authentication handler 2050 that verified the author at step 5010. In one embodiment, the source information of the modified raw data includes a type of an operation (e.g., modifying raw data in a composite object) and a time of the operation (i.e., when the operation is performed).

In one embodiment, if the editing monitor 2070 determines that an author performs copy-or-cut-and-pasting an element from another author's element/composite object or that an element is added to a composite object, e.g., by an insertion (e.g., inserting an element in a composite object), an attachment (e.g., attaching an element in a composite object), a reference (e.g., incorporating an element in a composite object by a reference; e.g., referencing an object in OOP (Object Oriented Programming)) or an inheritance (e.g., incorporating an element in a composite object by an inheritance; e.g., inheriting from a parent class in OOP), the source information analyzer 2100 automatically obtain source information of the element from the element itself, e.g., from information (e.g., author name, author email address, author phone number, etc.) in DTD (Document Type Declaration) tag, information (e.g., an owner of the copyright) in a copyright associated with the element, information (e.g., an owner of the trademark) in a trademark associated with the element and information in proprietary content (e.g., an owner of a patent) associated with the element. Then, source information analyzer 2100 records the author as an importer of the element in the composite object or a database associated with the composite object. In one embodiment, the automatically obtained source information is extended to include information of the importer (e.g., name of the importer, address of the importer, etc.), a type of an operation (e.g., copy-or-cut-and-pasting, inserting, attaching, etc.) and a time of the operation (i.e., when the operation is performed).

In one embodiment, the manual source information collector 2110 enables an author to manually add additional source information, e.g., an access right to an element that the author added, a usage right to an element that the author inserted, whether the author copied a portion of an open source software under a free licensing term or whether the author used ideas in a patent, a standard or an article. The author through the manual source information collector 2110 can enter any information considered as relevant to maintenance of the element into the additional source information.

Returning to FIG. 5, at step 5040, an association between source information as identified by the source information determining handler 2090 in step 5030 and a corresponding element is maintained. At this step, the source information recording handler 2120 embeds the source information of the corresponding element in a corresponding compound object. In one embodiment, the source information is periodically compressed and saved in an archive (e.g., a storage device 2010 in FIG. 1) and only links to the archive are left in the composite object to prevent a size of the composite object from growing too large. In another embodiment, the source information recording handler 2120 stores the source information in association with the element as an attached file. In a further embodiment, the source information recording handler 2120 stores the source information and the corresponding element in association in a repository, including but not limited to the server database 2160, which can be shared by different composite objects and users and can be queried for elements and source information in association, including any and all of known source information associated with a certain element or any and all elements associated with certain source information. In one embodiment, the source information can also be versioned (i.e., numbering source information to distinguish up-to-date source information and prior source information, each version is usually identified by a number, commonly of a form of x.y, where x is a major version number and y is a release number) by a SCM (Software Configuration Management; e.g., CVS from GNU, ClearCase™ from IBM®) used to version a corresponding composite object. At step 5050, the process for updating source information is completed.

Figure 6:
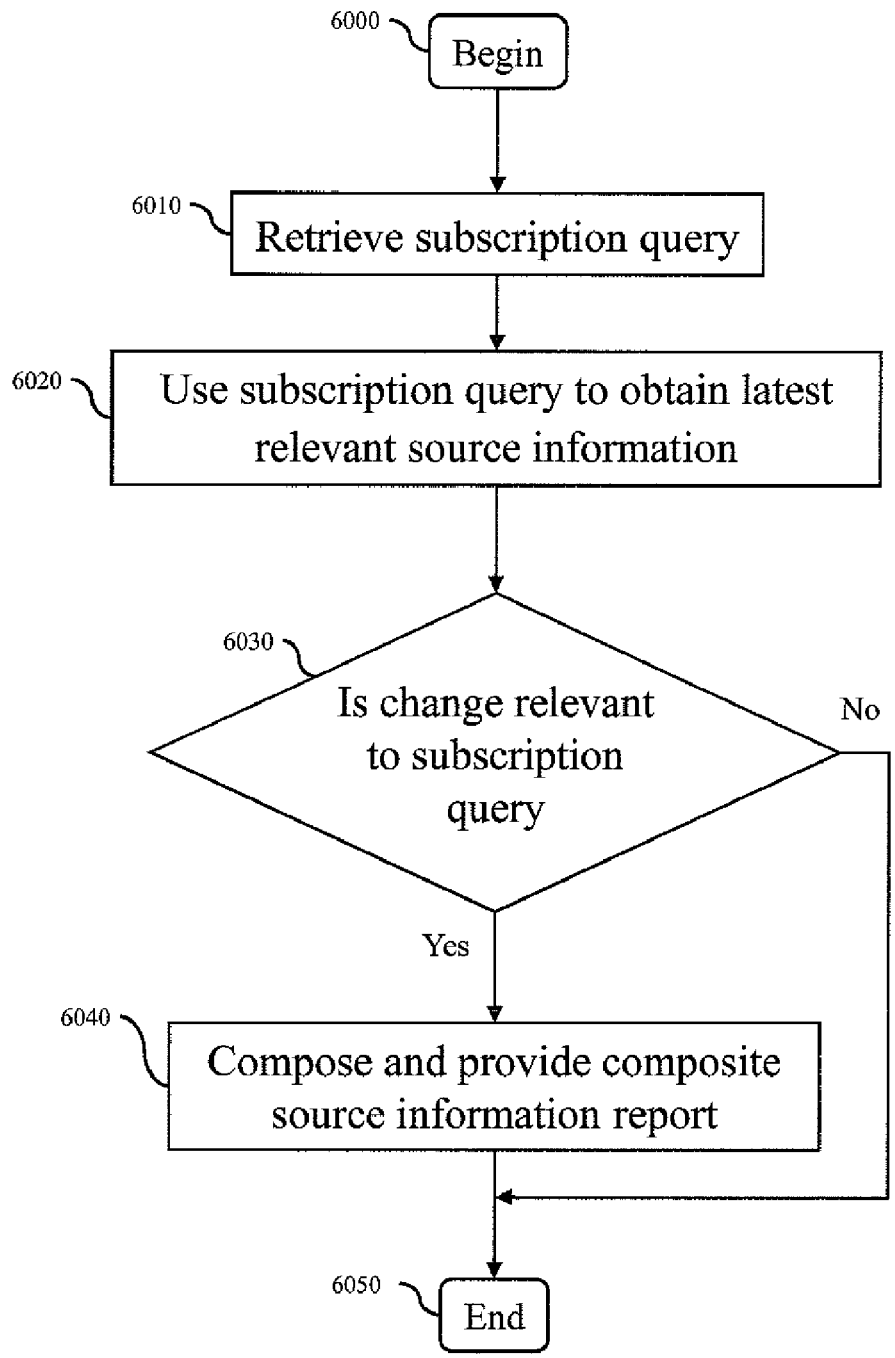
FIG. 6 depicts a flow chart of generating and providing a composite source information report in one embodiment of the present invention.

FIG. 6 depicts the flow control of generating and providing a composite source information report of a composite object. Especially, the composite source information report of the composite object is generated whenever source information of an element in the composite object is or has been updated. Then, the composite source information report is provided to subscribing users (users who submit a subscription request through steps 4000-4050 in FIG. 4). At step 6000, a process for generating and providing a composite source information report of a composite object is started (e.g., at step 3050 in FIG. 3). At step 6010, the subscription source information retrieving handler 2140 retrieves a subscription query (a subscription query is generated by parsing a completed subscription request form) of a user from a database (e.g., a server database 2160) associated with the user or the composite object.

At step 6020, the subscription source information retrieving handler 2140 provides the subscription query to the database (e.g., a server database 2160) to retrieve latest source information, which is related to the subscription query, from the database. At step 6030, it is evaluated whether source information has been updated since a last retrieval of the source information. In one embodiment, whenever new source information is recorded, e.g., by adding/deleting/modifying an element, in a composite object or a database associated with the composite object, the new source information is timestamped (a timestamp being a sequence of characters denoting date and/or time which a certain event occurred. A timestamp allows for easy comparison of different records and tracking progress over time; recording the timestamp in a consistent manner is called timestamping). Based on the timestamp(s) on source information, it is determined whether there has been an update on the source information since last retrieval of the source information through the subscription query. At step 6030, it is checked whether there has been update on source information relevant to the subscription query. If there has been no update since the last retrieval of the source information or there has been no update on source information relevant to the subscription query, at step 6050, the composite source information report generating handler 2150 generates no composite source information report.

If there has been an update on source information relevant to the subscription query since the last retrieval of the source information, e.g., there has been an update on source information of an element that a user specified on a subscription request (a completed subscription request form) since the last retrieval of the source information, at step 6040, the composite source information report generating handler 2150 generates a composite source information report based on the update on the source information and/or based on the source information, e.g., by analyzing and parsing the update on the source information and/or analyzing and parsing the source information. Then, the generated composite source information report is provided to user(s), who specified their interest (e.g., which element's source information they want to get informed of) on the subscription request or had interest in on the update on the source information (e.g., subscribes on a topic (e.g., an update on a specific element) in a publish/subscribe network (e.g., an asynchronous messaging network where senders of messages are not programmed to send their messages to specific receivers)). The generated composite source information report is provided to the user(s) via an email, instant messaging, FTP, WAP Push, postal mail and carrier service (e.g., UPS®). In one embodiment, the composite source information report generating handler 2150 alert the user(s), e.g., via WAP Push, that a new composite source information report is available in a specific web page and provides a hyperlink to the specific web page. Then, the user(s) may access the specific web page to look at the new composite source information report. In one embodiment, when the user(s) accessing the specific web page, the authentication handler 2050 performs verification of the user(s). In another embodiment, the user(s) can access the new composite source information without a verification process (e.g., verifying himself/herself thorough the authentication handler 2050). After providing the composite source information report to the user(s), the generating and providing the composite source information report is completed at step 6050.

What follows are four consecutive exemplary usage scenarios of the present invention.

Scenario #1, in which a first user, a manager, first requests and receives a composite source information report (CSIR) about a composite object.

1. The first user logs into a SCM (Software Configuration Management; e.g., IBM® ClearCase™) and has his identity authenticated through the authentication handler 2050.

2. The first user then requests that he wants to receive a composite source information report (CSIR) for the composite object whenever an element of the composite object is modified. Then, based on the request received from the first user, a default subscription query is automatically generated by parsing contents of the request from the first user.

3. The composite source information report generation handler 2150 creates a CSIR for the first user based on the default query, e.g., by providing the default query to a database (e.g., server database 2160) associated with the composite object, receiving results of the default query from the database and analyzing and parsing the results of the default query. This CSIR lists all elements of the composite object, indicating what source information is known at this time and what source information is not known at this time. For example, the CSIR may include:
   a. Indication of those elements whose source information is known,
   b. Indication of those elements whose source information is not known,
   c. Indication of the number of elements whose source information is not known, and
   d. Indication of the number of elements added by a particular user whose source information is not known.

4. The composite source information report generation handler 2150 provides this CSIR to the first user via an email, FTP, postal email, WAP Push (i.e., an alert or short message being sent or received under Wireless Application Protocol), instant messaging and carrier service.

Scenario #2, in which the first user, a manager, receives a composite source information report after a second user, a programmer, adds a new element to the composite object.

1. The second user logs into the SCM and the authentication handler 2050 verifies an identity of the second user.

2. The second user creates a new element and then adds the new element to the composite object.

3. The editing monitor 2070 detects that a user is adding the new element to the composite object and invokes the source information determining handler 2090. The source information determining handler 2090 obtains source information of the new element from a database (e.g., server database 2160) associated with the second user or from the authentication handler 2050 that verified the second user.

4. The source information recording handler 2120 embeds the source information of the new element into the composite object or into the database.

5. Since source information of the composite object has changed (e.g., source information of the new element is added to the source information of the composite object), the composite source information report generation handler 2150 creates a new CSIR for the first user. The new CSIR includes contents of previous CSIR and further includes that the second user added the new element. The new CSIR also includes that the source information of the new element obtained by the source information determining handler 2090. The new CSIR indicates an increase on the number of elements whose source information is known. The new CSIR may further indicate that the second user has one less element associated with the second user that still requires source information.

6. The composite source information report generation handler 2150 sends the new CSIR to the first user via an email, FTP, instant messaging, WAP Push, post mail and carrier service. The first user may also obtain the new CSIR by connecting to a web server provided by the composite source information report generation handler 2150. To obtain the new CSIR, the first user may log in to the web server and then select an "Obtain latest CSIR" menu (not shown). Then, the new CSIR is provided in HTML/XML form to a web browser (e.g., Apple® Safari®) that the first user is using.

Scenario #3, in which the first user, a manager, receives a composite source information report after an unknown user modifies an element in the composite object.

1. The unknown user enters the SCM without being verified through the authentication handler 2050.

2. The unknown user modifies an element by using the editing handler 2080.

3. The editing monitor 2070 detects that a user is modifying the element in the composite object and invokes the source information determining handler 2090. The source information determining handler 2090 contacts a database (e.g., server database 2160) associated the composite object or the authentication handler 2050 to identity the unknown user and to obtain information of the unknown user (source information of deleted parts in the element being modified or source information of added parts in the element being modified). However, the source information determining handler 2190 fails to obtain an identity of the unknown user, e.g., because the unknown user did not perform a user verification through the authentication handler 2050.

4. Then, the source information determining handler 2090 asks the unknown user to manually provide his/her identity (source information of the modified element), e.g., by invoking the manual source information collector 2110. However, the unknown user rejects to provide source information of the modified element or rejects to identify himself/herself.

5. Since source information of the composite object has changed (e.g., an element in the composite object is modified), the composite source information report generation handler 2150 creates a new CSIR for the first user. The new CSIR includes contents of previous CSIR and further includes that the unknown user modified the element. The new CSIR also includes that the source information of the modified element was not obtained by the source information determining handler 2090. The new CSIR indicates an increase on the number of elements whose source information is not known.

6. The composite source information report generation handler 2150 sends the new CSIR to the first user via an email, FTP, instant messaging, WAP Push, post mail and carrier service.

Scenario #4, in which the unknown user, who modified an element in the composite object, adds source information of the modified element.

1. The unknown user enters the SCM without a user verification process through the authentication handler 2050.

2. The unknown user selects a "Manually enter source information" menu (not shown) associated with the modified element. Then, the unknown user manually specifies source information of the modified element, e.g., by indicating that name of the unknown user, address of the unknown user, email address of the unknown user, access right of the modified element, etc., through the manual source information collector 2110.

3. Since the source information of the composite object (e.g., source information of the modified element became known), the composite source information report generation handler 2150 creates a new CSIR for the first user, this new CSIR indicates that:
   a. The source information of the modified element is now known,
   b. There is one less element with unknown source information, and
   c. The unknown user has one less element associate with the unknown user that still requires source information.
4. Once the new CSIR is generated, the composite source information report generation handler 2150 provides the new CSIR to the first user.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention. The present invention further includes a method of deploying a computer program product including a program of instructions in a computer readable medium to effect one or more functions of the present invention, wherein, when the program of instructions is executed by a processor, the computer program product performs the one or more functions of the present invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented system for dynamically providing a composite source information report whenever source information of a composite object is updated, the composite object including one or more elements, the system comprising:
   at least one memory device;
   at least one processor connected to the memory device, wherein the processor is configured to:
   receive a subscription request from a user for subscribing to the composite source information report, parse the subscription request to identify the user and to generate a subscription query, and store the subscription query associated with the user in a database;
   retrieve the subscription query from the database and retrieve the source information of the composite object based on the subscription query from the database;
   determine whether the source information of the composite object has been updated since a last retrieval of the source information of the composite object;
   automatically determine source information of an element in the composite object based on one or more of: information of a DTD (Document Type Declaration) tag associated with the element, intellectual property right or proprietary content associated with the element;
   generate a composite source information report based on the automatically determined source information of the element and provide the composite source information report to the user.

2. The system according to claim 1, wherein the composite source information report comprises one or more of:
   an indication of the elements whose source information is known;
   an indication of the elements whose source information is not known;
   an indication of the number of the elements whose source information is not known;
   an indication of the number of the elements added by a particular user whose source information is not known; and
   an indication of increases or decreases in the number of the elements whose source information is not known.

3. The system according to claim 1, wherein the the processor is configured to edit the composite object based on one or more of: adding an element in the composite object, deleting an element in the composite object, modifying an element in the composite object and importing an element into the composite object.

4. The system according to claim 1, wherein the processor is further configured to:
- add a new element and recording source information associated with the new element;
- retain a deleted element and source information associated with the deleted element; and
- combine the addition and the retention.

5. The system according to claim 1, wherein the source information of the composite object is updated by one or more of:
- an addition of new source information associated with an element in the composite object;
- a modification of the source information associated with an element in the composite object; and
- an addition of a new element in the composite object whose source information is not known.

6. The system according to claim 1, wherein the subscription query specifies one or more of:
- a change in the source information that will trigger generating a new composite source information report;
- the source information that is included in the new composite source information report; and
- the elements in the composite object.

7. The system according to claim 1, wherein the source information is categorized in the composite source information report according to one or more of: by a developer of an element, by an owner of an element, by an element, by an entry date of an element and by a subject of an element.

8. A computer-implemented method for dynamically providing a composite source information report whenever source information of a composite object is updated, the composite object including one or more elements, the method comprising:
- receiving a subscription request from a user for subscribing to the composite source information report, parsing the subscription request to identify the user and to generate a subscription query, and storing the subscription query associated with the user in a database;
- retrieving the subscription query from the database and retrieving the source information of the composite object based on the subscription query from the database;
- automatically determining source information of an element in the composite object based on one or more of: information of a DTD (Document Type Declaration) tag associated with the element, intellectual property right or proprietary content associated with the element;
- determining whether the source information of the composite object has been updated since a last retrieval of the source information of the composite object; and
- generating a composite source information report based on the automatically determined source information of the element and providing the composite source information report to the user.

9. The computer-implemented method according to claim 8, wherein the composite source information report comprises one or more of:
- an indication of the elements whose source information is known;
- an indication of the elements whose source information is not known;
- an indication of the number of the elements whose source information is not known;
- an indication of the number of the elements added by a particular user whose source information is not known; and
- an indication of increases or decreases in the number of the elements whose source information is not known.

10. The computer-implemented method according to claim 8, further comprising: editing the composite object based on one or more of: adding an element in the composite object, deleting an element in the composite object, modifying an element in the composite object, and importing an element into the composite object.

11. The computer-implemented method according to claim 8, further comprising:
- adding a new element in the composite object and recording source information associated with the new element;
- retaining a deleted element and source information associated with the deleted element; and
- combining the adding and the retaining.

12. The computer-implemented method according to claim 8, wherein the source information of the composite object is updated by one or more of
- an addition of new source information associated with an element in the composite object;
- a modification of the source information associated with an element in the composite object; and
- an addition of a new element in the composite object whose source information is not known.

13. The computer-implemented method according to claim 8, wherein the subscription query specifies one or more of:
- a change in the source information that will trigger generating a new composite source information report;
- the source information that is included in the new composite source information report; and
- the elements in the composite object.

14. The computer-implemented method according to claim 8, wherein the source information is categorized in the composite source information report according to one or more of: by a developer of an element, by an owner of an element, by an element, by an entry date of an element and by a subject of an element.

15. A program storage device, readably by machine, tangibly embodying a program of instructions executable by a machine to perform method steps for dynamically providing a composite source information report whenever source information of a composite object, which is being developed, is updated, the composite object including one or more elements, said method steps comprising the steps of claim 8.

* * * * *